June 29, 1948.   H. W. HOFFMAN ET AL   2,444,352
CIRCUIT CONTROLLING APPARATUS
Filed Feb. 16, 1945   2 Sheets-Sheet 1

INVENTORS
HARRY WILLIAM HOFFMAN
GROVER H. HELMER
By Paul, Paul & Moore
ATTORNEYS June 29, 1948. H. W. HOFFMAN ET AL 2,444,352
CIRCUIT CONTROLLING APPARATUS
Filed Feb. 16, 1945 2 Sheets-Sheet 2

INVENTORS
HARRY WILLIAM HOFFMAN
GROVER H. HELMER
By Paul, Paul & Moore
ATTORNEYS Patented June 29, 1948

2,444,352

UNITED STATES PATENT OFFICE 2,444,352

CIRCUIT CONTROLLING APPARATUS

Harry William Hoffman, Anoka, and Grover H. Helmer, St. Louis Park, Minn., assignors to Federal Cartridge Corporation, Minneapolis, Minn., a corporation of Minnesota Application February 16, 1945, Serial No. 578,270

4 Claims. (Cl. 200—83)

1

This invention relates to a circuit controlling apparatus and more particularly to a relay device capable of opening an electrical circuit when a condition varies from a functional condition towards a datum condition after having been pre-set to the functional condition at the initiation of actuation. More specifically the invention relates to a circuit interrupting device wherein the circuit closure is initiated in the apparatus by the establishment of a functional pressure which is different from a datum pressure and thereafter interruption of the circuit immediately occurs in the event the pressure changes from said functional pressure towards said datum pressure.

It is an object of the invention to provide such a circuit controlling apparatus. It is a further object of the invention to provide a vacuum or pressure responsive circuit interrupting device capable of immediately opening the circuit when the functional pressure or vacuum changes in a direction towards a datum pressure. It is also an object of the invention to provide a pressure or vacuum responsive circuit-interrupting device of great sensitivity and ruggedness and capable of being manufactured at low cost.

Other and further objects of the invention are those inherent in the apparatus herein illustrated, described and claimed.

The invention is illustrated with reference to the drawings in which

Throughout the drawings corresponding numerals indicate identical parts.

Figure 1:
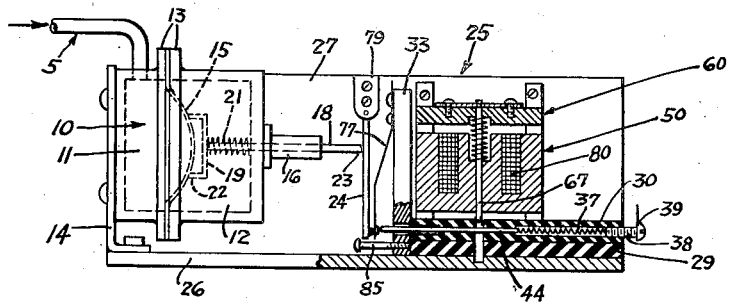
Figure 1 is a front elevational view, partly in section, of one form of the invention wherein the contacts are pressure operated.

Referring to Figures 1–4 an air pressure line 5 extends into the apparatus from a pressure line

2 or pressure vessel, the variations in pressure of which are desired to be utilized for operating the circuit interrupting device. One utilization of the invention is illustrated in our copending application Ser. No. 518,962 of which the present application is a continuation-in-part.

Line 5 extends to a pressure responsive apparatus generally designated 10, comprising complementary flanged containers 11 and 12 which are fastened at the flanges 13 by screws or other suitable fastening devices. The member 11 is mounted by means of bracket 14 in any suitable manner. Between the flanges 13 there is fastened a rubber diaphragm 15 which is normally situated in a flat plane directly in a line with the flange 13. The container 12 is provided with an axial collar 16 which is drilled to receive a stem 18 upon which there is mounted a cup 19 of considerably smaller diameter than the interior of the container 12. A light spring may be provided at 21, if desired, to maintain the flange 22 of the cup in contact with the rubber diaphragm 15. The outer end 23 of the stem 18 is arranged to abut against the swinging arm 24 of a pressure relay mechanism generally designated 25.

Figure 3:
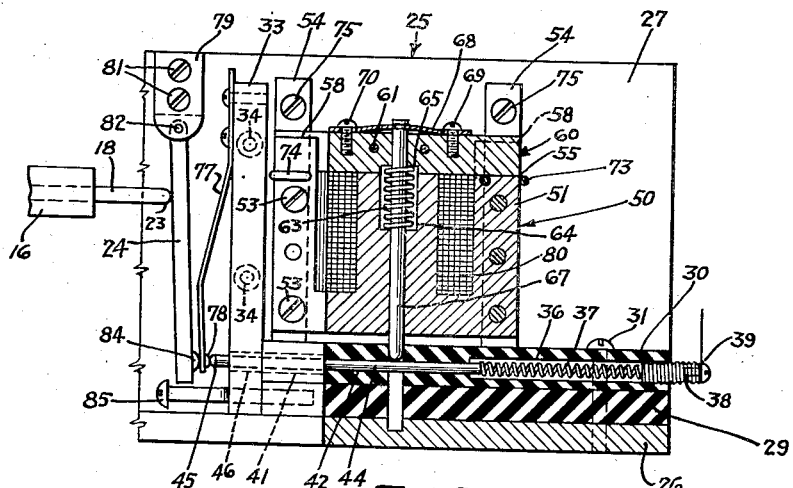
Figure 3 is an enlarged fragmentary front elevational view, partly in section, of the apparatus shown in Figure 1.
Figure 4:
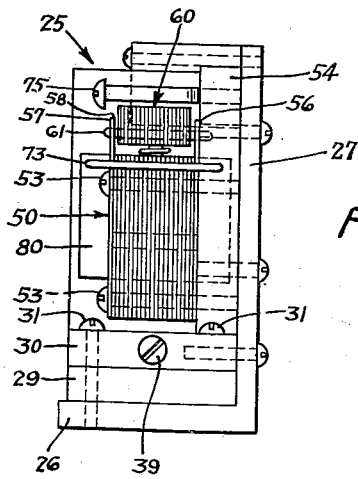
Figure 4 is an enlarged end elevational view of the apparatus shown in Figure 1.

The relay mechanism 25 includes an angle-iron support having a base 26 and a back 27 which may conveniently also support the pressure device 10, although a separate base may be used if desired. Upon the base there are mounted a pair of superimposed insulating blocks 29 and 30 which are fastened to the base by means of screw 31, Figure 3. At the left end of the insulating blocks 29 and 30, shown in Figure 3, there is mounted a vertical block of insulating material 33 which is fastened to the back of the instrument by means of screws 34. The insulating block 30 is drilled at 36 to receive a spring 37 which is held in place by means of a screw plug 38 having an electrical terminal 39 thereon. At the opposite end, the block 30 is drilled out to the depth shown at 41, the intermediate portion between holes 41 and 36 being drilled in a smaller diameter, as illustrated at 42, to receive a rod 44 of conducting material which is preferably tipped at 45 with a contact material such as silver or platinum-iridium alloy. The end insulating block 33 is likewise drilled out at 46 in line with the hole 41 in the block 30 so as to allow free passage of the rod 44 therethrough. Spring 37 of electrically conductive material urges the rod 44 to the left, as shown in Figures 1 and 3.

Supported above the insulating block 30 there is mounted a core and winding assembly generally designated 50. The portion 51 of the core is E-shaped and is stationary, being solidly fastened to the back 27 of the framework by means of a plurality of screws 53 which pass through the spacing blocks 54 so as to maintain the core at an appropriate distance from the back 27 to allow space for the winding. The stationary E-shaped portion of the core is terminated in a horizontal upper surface 55, except for the preferably thick front and back laminations 56 and 57 which extend upwardly to the level 58, as illustrated in Figure 3 so as to form a guide for the vertically movable armature generally designated 60.

The armature 60 is likewise made up of a plurality of laminations held together by means of rivets or other fastenings. The armature 60 is normally maintained out of contact with the stationary core by means of a spring 63 which rests in a hole 64 in the E-shaped core 50 and extends upwardly into a corresponding countersunk hole 65 in the under side of the movable armature. The armature 60 and also the middle leg of the stationary E-shaped core 50 are drilled to receive the vertically movable locking rod 67 which is fastened to the leaf spring 68, the latter in turn being flexibly attached to the armature by means of the screws 69 and 70. The stationary core 50 is provided with shading coils 73 and 74 and the armature is provided with a shading coil 61 to prevent chattering. A pair of screws 75 extending outwardly from the back board 27 serve as a back stop to keep the armature 60 from moving too far upwardly under the influence of the spring 63. The stationary core 50 is provided with a winding 80.

Upon the vertical insulating block 33 there is mounted a spring contact 77 provided with a contact tip 78 positioned to cooperate with the contact 45 on rod 44. The pivotal arm 24 is mounted by means of the pivot block 79 which is in turn fastened to the back 27 by means of screws 81. The pivot block 79 is provided with a pivot pin 82 which serves to suspend the swinging arm 24. The arm 24 is provided with a round insulating button 84 which abuts against the back of spring contact 77. Swinging movement of the arm 24 to the left, as shown in Figures 1 and 3, is limited by the head of the adjustable screw 86.

In use the pipe connection 5 of the apparatus shown in Figures 1–4 is connected to a pressure line or pressure vessel, the decrease in pressure of which is desired to be indicated by the opening of contacts 78 and 45. When pressure is applied to line 5 it is communicated to chamber 11. The pressure established in the line 5 serves to flex the diaphragm 15 which pushes against the cup 22 and thus forces stem 18 against the action of spring 21, if used, thus tending to swing arm 24 in a counterclockwise direction with the result that contact 78 is moved against rod contact 45. The permissible movement of contact 78 is relatively large to accommodate varying pressure on diaphragm 15, and as a consequence of the pressure exerted by the diaphragm 15, rod 18 is moved, thus swinging arm 24, and moving contacts 78 and 45 as a unit to the right, as shown in Figures 1 and 3, against the pressure of springs 21 and 37 until the pressure of springs 21 and 37 balances the pressure exerted by the diaphragm. The position of contact 78 and contact 45, moving as a unit, is thus adjusted automatically in accordance with the applied pressure, and there is initially established a functioning position for contact 45. Through circuit connections not illustrated the winding 80 is energized. When this occurs the armature 60 is drawn downwardly into contact with the E-shaped core 50. The shading coils 73 and 74 as well as the shading coil 61 serve to maintain the armature uniformly in contact and prevent chattering. The armature 60 is drawn down against the pressure of spring 63. As the armature is drawn down the rod 67 is also forced downwardly until its bottom end is moved into contact with the rod 44, and thereafter rod 67, which is then seated, causes the leaf spring 68 to bow upwardly. Thus, the relay forces rod 67 downwardly into locking engagement with the rod 44 and clamps the latter against further movement.

Any drop in the pressure on line 5 thereafter occurring is communicated to the chamber 11 and permits the rubber diaphragm 15 to retract and hence moves rod 18 and swinging arm 24 to the left, as illustrated in Figures 1 and 3. After a very small drop in pressure, contact 78 separates from contact 45 and this serves to break the previously established circuit between spring contact 77 and terminal 39. This circuit opening operation, which occurs at the slightest drop in pressure in line 5, may be utilized for any service function, as for example the actuation of an alarm as illustrated in our copending application Ser. No. 518,962 or for operating a work circuit or other purposes as desired.

Figure 5:
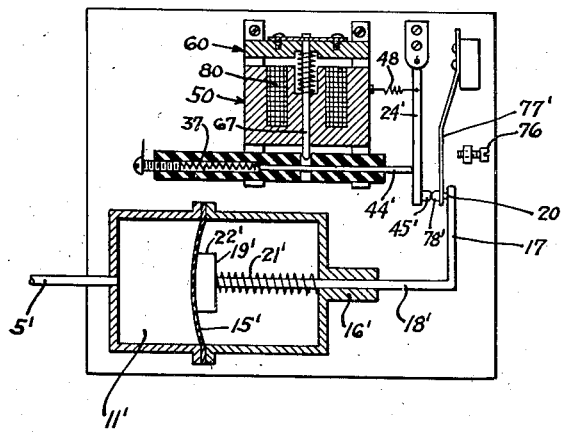
Figure 5 is a front elevational view, partly in section, of the second form of the invention wherein the circuit interrupting contacts are actuated by variations in negative pressure, i. e., variation in degree of vacuum.
Figure 2:
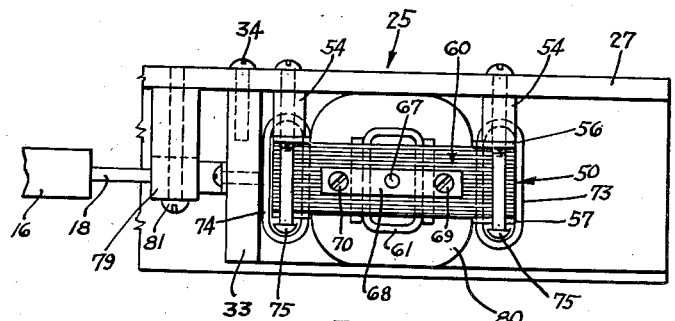
Figure 2 is an enlarged fragmentary plan view of a portion of the apparatus shown in Figure 1.

Referring to the apparatus illustrated in Figure 5 the mechanism there shown is adapted to indicate any increase in absolute pressure of a vacuum containing line or vessel. Thus, the service connection 5' may be a vacuum line or connected to a vessel which is evacuated for testing purposes. Line 5' is connected to the vacuum chamber 11' which is constructed similarly to that shown in Figure 1 having a diaphragm 15' against which the flange 22' of the cup 19' is adapted to rest. The cup 19' is mounted on the rod 18' which has a bent over end 17 having a tip 20 thereon. The rod is urged to the left as shown in Figure 5 by means of the coil spring 21', the entire rod being supported for slidable movement from left to right in the journal 16'. The rod 18' may be squared or may be provided with a suitable key so as to prevent rotation and thus keep the side arm 17 and tip 20 in a position so as to engage the back of contact 77'. The contact 77' is flexible and is provided with a working contact surface 78' that is aligned with the contact tip 45' on the swinging arm 24'. Spring contact 77' is biased to the right, and its limiting position may be established by a block or stop screw 76. The rod 44' in this instance is not provided with a contact but merely engages the back of the swinging arm 24'. The locking solenoid 50 is otherwise identical with that illustrated in Figures 1–4.

In operation a vacuum is applied to line 5' and this, when communicated to the space 11' under diaphragm 15' causes it to move to the left as shown in Figure 5 whereupon rod 18' is likewise moving to the left. In so doing the side arm 17 having the tip 20 thereon is likewise moved to the left and thus engages the back of spring contact 77' moving contact 78' into engagement with contact 45' on the swinging arm 24', and through the latter forces the rod 44' against the action of spring 37 until a balanced position is reached corresponding to the vacuum to the left of the diaphragm 15'. The winding of locking relay 50 is then energized through circuit connections not illustrated and the armature 60 is drawn down, thus locking the rod 44' in an established position which varies in accordance with the absolute pressure (vacuum) in the system. Any increase in the absolute pressure (decrease in vacuum) subsequently occurring forces the diaphragm 15' to the right and thus allows spring 77' likewise to move to the right, separating contact 78' from contact 45'. The swinging arm 24' is normally urged to the left under light pressure by means of the light coil spring 48 and therefore never moves out of contact with the tip of rod 44'.

It will thus be appreciated that by utilizing the apparatus of Figures 1-5 it is possible to indicate the slightest change of pressure from any functioning pressure, either positive or negative pressure, towards a datum pressure, and since the contacts of the relay apparatus are positioned in accordance with the functioning pressure, even the slightest change toward a datum pressure is immediately effective to separate the contacts and operate a signal or work circuit as desired.

It will be appreciated that rods 18 or 18' may be operated by any mechanical or electrical device which moves from a datum position to a functioning position and thereafter moves towards the datum position. By utilizing the apparatus herein illustrated there may immediately be indicated the slightest back movement towards the datum position after the contacts are locked in the functioning position. By utilizing two relays, one of the type shown in Figures 1-4 and the other of the type shown in Figure 5, and by connecting lines 5 and 5' to the same pressure source, there is provided a combined system capable of response at either positive or negative pressures. In such a system contacts 45—78 and 45'—78' may be connected in a single series circuit and their separate effects may likewise be utilized if desired.

This application is a continuation-in-part of our application Ser. No. 518,962, filed January 20, 1944.

As many apparently widely different embodiments of this invention may be made without departing from the spirit and scope thereof, it is to be understood that we do not limit ourselves to the specific embodiments herein except as defined by the appended claims.

What we claim is:

1. An electrical contact apparatus comprising a first movable contact and a second movable cooperative contact, said first movable contact being biased away from the second contact, means movable from and towards a datum position for moving the biased contact into engagement with the movable contact and for moving said contacts while engaged to a functioning position and means for frictionally locking said cooperative second contact against further movement when in said functioning position, including a locking bar movable transversely of the cooperative contact from a position out of engagement therewith to a locking position in frictional engagement therewith, an electromagnetically operated core for effecting said locking movement, and resilient means connecting said locking bar and electromagnetic core so as to permit free movement of the electromagnetically operated core without imposing undue frictional force on the cooperative contact, whereby when said means for moving the first contact then moves from said functioning position towards said datum position, the first contact will immediately disengage from the second contact.

2. An electrical contact apparatus comprising a support, a first contact movably mounted on said support, and a cooperative contact in the form of a member slidably mounted for movement on said support, said first contact being biased away from the second contact, spring means for slidably moving the cooperative contact towards the first contact, fluid means movable from and towards a datum position, for moving the biased contact into engagement with the movable contact and for moving said contacts while so engaged to a functioning position, and means for locking said cooperative second contact against further movement when in said functioning position, including a locking bar movable in said support from a position out of engagement with said cooperative contact to a position in frictional engagement with said contact, resilient means for normally holding said locking bar out of frictional engagement with said cooperative contact and electromagnetic core means resiliently attached to said locking bar for moving it towards locking position, whereby when the fluid means moves towards the datum position said first contact is immediately disengaged from the second contact.

3. An electrical contact apparatus comprising a support, a first contact movably mounted on said support, and a cooperative contact in the form of a member slidably mounted for endwise movement on said support, said first contact being biased away from the cooperative contact, spring means for slidably moving the cooperative contact towards the first contact, pressure means movable upon increase in pressure from a datum position for moving the first or biased contact into engagement with the cooperative contact and for moving said contacts while so engaged to a functioning position, and means for locking said cooperative contact against further movement when in said functioning position, including a locking bar movable in said support from a position out of engagement with said cooperative contact to a position in frictional engagement with said contact, spring means for normally holding said locking bar out of engagement with said second contact, and electromagnetic core means resiliently attached to said locking bar for moving it into frictional engagement with the cooperative contact, whereby when the pressure decreases and said pressure means moves towards the datum position and said first contact is immediately disengaged from the second contact.

4. An electrical contact apparatus comprising a support, a first contact movably mounted on said support, and a cooperative contact in the form of a member slidably mounted for endwise movement on said support, said first contact being biased away from the cooperative contact, spring means for slidably moving the cooperative contact towards the first contact, vacuum means movable upon decrease in absolute pressure, from a datum position for moving the first contact into engagement with the cooperable contact and for moving said contacts while so engaged to a functioning position, and means for frictionally locking said cooperative contact against further movement when in said functioning position, including a locking bar slidably movable in said support from a position out of engagement with said cooperative contact to a position in engagement with said contact, spring means for normally holding said locking bar out of engagement with said cooperative contact and electromagnetic core means resiliently attached to said locking bar for moving said bar towards locking position, whereby when the vacuum decreases and the absolute pressure increases, said vacuum means moves towards the datum position and said first contact is immediately disengaged from the second contact.

HARRY WILLIAM HOFFMAN.
GROVER H. HELMER.

REFERENCES CITED

The following references are of record in the file of this patent:

UNITED STATES PATENTS

| Number | Name | Date |
| --- | --- | --- |
| 1,584,939 | Holmes | May 18, 1926 |
| 2,268,124 | Maybarduk | Dec. 30, 1941 |